United States Patent [19]

Dick et al.

[11] 4,109,066

[45] Aug. 22, 1978

[54] POLYACRYLIC ACID MEMBRANES FOR ELECTROCHEMICAL USE

[75] Inventors: Richard Dick, Paris; Georges Feuillade, Arpajon; Robert Gedessaud, Massy Palaiseau; Louis Nicolas, Neuilly sur Seine, all of France

[73] Assignees: Compagnie Generale d'Electricite; Institut National de Recherche Chimique Appliquee Ircha, both of Paris, France

[21] Appl. No.: 860,649

[22] Filed: Dec. 14, 1977

[30] Foreign Application Priority Data

Dec. 14, 1976 [FR] France .................................. 76 37573

[51] Int. Cl.$^2$ ....................... H01M 10/04; H01M 2/16
[52] U.S. Cl. .................................... 429/145; 427/115; 429/249; 429/204; 429/254; 521/62
[58] Field of Search .............. 429/254, 251, 248, 249, 429/145; 427/115, 430 R; 260/2.5 M

[56] References Cited

U.S. PATENT DOCUMENTS

| | | | |
|---|---|---|---|
| 2,700,694 | 1/1955 | Fernald | 429/254 |
| 3,069,340 | 12/1962 | Mindick et al. | 429/254 |
| 3,730,777 | 5/1973 | Krey | 429/251 |
| 4,024,323 | 5/1977 | Versteegh | 429/249 |

*Primary Examiner*—Donald L. Walton
*Attorney, Agent, or Firm*—Sughrue, Rothwell, Mion, Zinn and Macpeak

[57] ABSTRACT

The invention relates to a semi-permeable membrane for a lead-acid battery. The membrane has a microporous structure comprising a first polymer and a second polymer intimately mixed together, and is characterized by the fact that the first polymer is chosen from among the following polymers: polyacrylic acid, polymethacrylic acid, a copolymer with a high proportion of acrylic or methacrylic acid, a mixture of these polymers, the average molecular weight of these polymers lying between 10,000 and a few millions and preferably between 50,000 and one million, the second polymer being soluble in water.

18 Claims, No Drawings

POLYACRYLIC ACID MEMBRANES FOR ELECTROCHEMICAL USE

The present invention relates to the preparation of membranes based on polyacrylic or polymethacrylic acid. The invention also relates to membranes so prepared.

The membranes which are mentioned hereinafter have electrochemical characteristics (electrical resistance, selectivity with respect to SbO+ ions) which are close to those of poly (2-hydroxyethlymethacrylate) membranes, however their chemical stability (resistance to acid hydrolysis and to oxidation) is greater.

The basic constituent of these membranes is polyacrylic or polymethacrylic acid and optionally a copolymer of acrylic or methacrylic acid having high acrylic or methacrylic acid contents. The molecular weight of these polymers lies between 10,000 and several million.

The applicants have observed that homogenous film or polyacrylic acid have good resistance to the action of oxygen and of sulphuric acid diluted to 9N, but that their electrical resistance measured in a 9N aqueous $H_2SO_4$ medium is relatively high. Thus, a film 40 $\mu$ thick prepared by complete evaporation of an aqueous solution of PRIMAL A5 (ROHM and HAAS) has an electrical resistance of 2 $\Omega/cm^2$.

Preferred embodiments of the present invention provide polyacrylic or polymethacrylic acid membranes with low electrical resistance (100 m$\Omega/cm^2$) but nevertheless selective with respect to antimonyl ions. The invention also provides a method capable of preparing such membranes.

The present invention provides a semi-permeable membrane having a microporous structure comprising a first polymer and a second polymer initimately mixed together, wherein the first polymer is chosen from among the following polymers: polyacrylic acid, methacrylic acid, or a mixture of these polymers; the average molecular weight of these polymers lying between 10,000 and a few million and preferably between 50,000 and a million; wherein the second polymer is soluble in water and is chosen from among the following polymers: polyvinylpyrrolidone, polyvinylic alcohol, a copolymer containing vinylpyrrolidone or vinylic alcohol sequences, or a mixture of these polymers; and wherein the microporous structure of the membrane is obtained by immersion, in an electrolyte such as aqueous $H_2SO_4$, of a film whose composition by weight is as follows:

20 to 70% of the first polymer;
20 to 70% of the second polymer;
Oto 40% of a plasticizer of the preceding polymers, chosen from among the following substances: N-methylpyrrolidone, glycerol sulfolane, hexamethylphosphoramide; and
0 to 20% of an organic or inorganic basic compound such as NaOH, KOH, or triethylamine.

The structure of the membranes is rendered microporous by means of a pore-forming agent. Such a structure develops automatically on the membrane coming into contact with the electrolyte contained in lead-acid storage cells (9N $H_2SO_4$), because of the incorporation, in the polyacrylic acid solution used for preparing the membranes, of one or several polymers which can be extracted partially from the membrane by the electrolyte. Among the polymers which can be used for this purpose, there should be mentioned in particular polyvinylpyrrolidone and the copolymers of vinylpyrrolidone as well as polyvinylic alcohol and the copolymers of vinylic alcohol. All these polymers are soluble in the medium constituted by 9N aqueous $H_2SO_4$ whereas polyacrylic acid is insoluble therein.

The electrical resistance and the selectivity of the membranes decrease when the concentration of the extractable polymer in the 9N $H_2SO_4$ increases.

To obtain membranes with an electrial resistance lower than or equal to 100 m$\Omega/cm^2$, it is necessary to incorporate 20% to 70% of extractable polymer in the membrane. This proportion depends on the molecular weight of the extractable polymer as well as the molecular weight of the polyacrylic or polymethacrylic. It is an advantage to use a high proportion of extractable polymer when the molecular weight of the polyacrylic or polymethacrylic acid is high. This is a consequence of the fact that the swelling of the membranes in the 9N $H_2SO_4$ medium decreases when the molecular weight of the polyacrylic or polymethacrylic acid increases.

It should be observed that all of the pore-forming polymers incorporated in the membrane cannot be extracted by the electrolyte. This is not a disadvantage, since the polymers which remain in the membrane contribute to increasing the swelling of the membrane and consequently increasing its electrolyte content.

The addition of a plasticizer of polyacrylic or polymethacrylic acid imparts some plasticity to the membrane which facilitates the handling thereof in the dry state. The plasticizers should be used which are soluble in the 9N $H_2SO_4$ medium, such as methylpyrrolidone, glycerol, hexametapol, sulfolane and others.

The use of polyvinylic alcohol as a polymer which is extractable in 9N $H_2SO_4$ allows the proportion of plasticizer of the membrane to be reduced, since this polymer has by itself film forming properties.

The solvent used is preferably water. When the molecular weight of the polyacrylic or polymethacrylic acid is high, it is necessary to neutralize it partially or totally by an organic or an inorganic base such as soda or triethylamine in order to allow it to be put into a solution in water. Another advantage of this neutralisation is that it makes the polyacrylic or polymethacrylic acid compatible with the polyvinylpyrrolidone and in the case where polyvinylic alcohol is used as an extractable polymer, that it limits the esterification of the polyacrylic acid.

The invention also relates to a method of production of such membranes.

The membranes can be put into contact with the electrolyte at ambient temperature or at a temperature lying between 10° C and 50° C.

The membranes in accordance with the invention can be used such as they are or with a reinforcement formed by a fabric or a felt made from a resistant material. Such a reinforcement makes it possible to increase the mechanical properties and in particular the dimensional stability of the membranes.

The membranes are prepared by using an applicator to spread an aqueous solution of polyacrylic or polymethacrylic acid to which is added a plasticizer and one or several polymers soluble in 9N $H_2SO_4$ on a sheet of TERPHANE placed on a plane support. The water can be evaporated at a temperature lying between 25° C and 90° C.

one of the following methods can be used to reinforce the membranes by means of a fabric (or felt):

If it is required to obtain an assymmetrical membrane comprising the actual membrane on one side and the fabric (or felt) on the other side, the moistened fabric (or felt) is applied on the dry membrane prepared as described hereinabove; after the fabric (or felt) has been dried, the membrane adheres strongly to it.

If on the contrary it is preferred to incorporate the fabric (or felt) entirely in the membrane, it is impregnated with the polyacrylic acid solution; this can be done by applying the moistened fabric (or felt) on a plane support and by spreading the solution by means of an applicator on the fabric (or felt).

The use of the first method, followed by the application of a further layer of solution on the fabric after the fabric has been dried makes it possible to obtain a symmetrical membrane whose total thickness can be chosen so that it extends only slightly beyond the thickness of the fabric. This membrane will not have a tendency to roll up.

Another method which can be used to prepare membranes reinforced by fabric (or felt) consists in immersing the fabric in the solution and then suspending it by one end so that the excess solution can drain and dry simultaneously on both surfaces of the fabric.

The following examples, given purely by way of illustration having no limiting character, illustrate the invention and show how it can be put into practice.

EXAMPLE 1

Firstly, an aqueous polyacrylic solution was formed as commercialized by the firm of ROHM and HAAS under the name of PRIMAL A5 (molecular weight 300,000). After partial neutralisation of the solution (25% of the polyacrylic acid) by a 2N soda solution, there was added thereto an aqueous solution of polyvinylpyrrolidone (LUVISKOL K30 whose molecular weight is 50,000 commercialized by B. A. S. F.) as well as N-methylpyrrolidone so that its final composition by weight is as follows:

100 parts of polyacrylic acid;
100 parts of polyvinylpyrrolidone (LUVISKOL K30);
60 parts of N-methylpyrrolidone;
13.9 parts of NaOH; and
858 parts of water.

This solution was spread by means of an applicator on a glass fabric (10 × 20 cm) impregnated with water and stretched on a plane support covered with a film of TERPHANE. The fabric was wetted with water to facilitate its application on the TERPHANE film. The use of this film was to facilitate the unsticking of the membrane after the evaporation of the water. Such evaporation can be effected in air or in a thermostatted chamber at a temperature lying between 30° C and 60° C.

The glass fabric used weighed 35 grams per square meter; its thickness was 35 microns; the number of threads in its warp and its weft were respectively 31 and 26.

The total thickness of the membrane including the fabric was 70 microns.

After immersion of the membrane during about 48 hours in a 9N aqueous $H_2SO_4$ solution at ambient temperature, its electrical resistance measured in the same medium at 25° C was of the order of 100 m$\Omega$/cm$^2$ and its permeability to $Sb_2O_3$ was 0.05 mg/h-cm$^2$.

In order to find out how the membrane would age, this membrane underwent an accelerated ageing test which consisted in keeping it in a 9N aqueous $H_2SO_4$ solution heated to 70° C and saturated with oxygen. Its characteristics measured periodically during the 100 days of the test practically did not vary. Its electrical resistance varied between 70 and 100 m$\Omega$/cm$^2$ and its permeability to $Sb_2O_3$ stabilized at 0.02 mg/h-cm$^2$.

Another membrane prepared in almost similar conditions and subjected to the same 100-day ageing test had an electrical resistance lying between 130 and 170 m$\Omega$/cm$^2$ for a permeability to $Sb_2O_3$ lying between 0.001 and 0.002 mg/h-cm$^2$.

EXAMPLE 2

A membrane was prepared in accordance with the conditions set forth in example 1, but using LUVISKOL K90 (molecular weight 500,000) instead of LUVISKOL K30 as a pore-forming agent.

The composition by weight of the solution used to prepare the membrane was as follows:

100 parts of polyacrylic acid;
100 parts of polyvinylpyrrolidone (LUVISKOL K90);
60 parts of N-methylpyrrolidone;
13.9 parts of NaOH; and
1690 parts of water.

The initial characteristics of the membrane whose total thickness was 55 microns were as follows:

Electrical resistance measured in 9N $H_2SO_4$ at 25° C: 50 m$\Omega$/cm$^2$; and permeability to $Sb_2O_3$/0.145 mg/h-cm$^2$.

After a 40-day ageing test carried out in the same conditions as for the membrane in example 1, the electric resistance was 80 m$\Omega$/cm$^2$ and the permeability to $Sb_2O_3$ was less than 0.1 mg/h-cm$^2$.

EXAMPLE 3

A membrane was prepared in accordance with the conditions set forth in example 1, using glycerol in the place of N-methylpyrrolidone.

The composition by weight of the solution used for preparing the membrane was as follows:

100 parts of polyacrylic acid;
100 parts of polyvinylpyrrolidone (LUVISKOL K30);
60 parts of glycerol;
13.9 parts of NaOH; and
858 parts of water.

The initial characteristics of the membrane whose total thickness was 60 microns were as follows:

Electrical resistance measured in 9N $H_2SO_4$ at 85° C: 85 m$\Omega$/cm$^2$: and permeability to $Sb_2O_3$: 0.03 mg/h-cm$^2$.

EXAMPLE 4

An aqueous solution of PRIMAL A5 was used to which an aqueous solution of polyvinylic alcohol (MOWIOL 28/99 manufactured by HOECHST) was added so that the composition by weight of the solution was as follows:

100 parts of polyacrylic acid;
60 parts of polyvinylic alcohol; and
874 parts of water.

This solution was spread by means of an applicator on a plane surface covered with a film of TERPHANE. A membrane reinforced by the same fabric as that mentioned in example 1 was prepared and so was another without reinforcement.

The initial characterristics of the membrane prepared without fabric and whose thickness was 65 microns were:

Electrical resistance measured in 9N aqueous $H_2SO_4$ at 25° C: 90 m$\Omega$/cm$^2$; and Permeability to $Sb_2O_3$: 0.01 mg/h-cm$^2$.

These characteristics became after a 30-day ageing test carried out in the same conditions as for the membranes of example 1 respectively 120 m$\Omega$/cm$^2$ and 0.015 mg/h-cm$^2$.

The initial characteristics of the membrane reinforced by the glass fabric whose total thickness was 70 microns were:

Electrical resistance: 190 m$\Omega$/cm$^2$; and

Permeability to $Sb_2O_3$: 0.05 mg/h-cm$^2$.

After a 49-day ageing test carried out in the same conditions as for the membranes of example 1, these characteristics were respectively 170 m$\Omega$/cm$^2$ and 0.033 mg/h-cm$^2$.

EXAMPLE 5

An aqueous solution was prepared from a copolymer of acrylic and methacrylic acid whose molecular weight lies between 500,000 and 1 million (commercialized by FLUKA) neutralized by soda and an aqueous solution of polyvinylpyrrolidone (LUVISKOL K90) was added to it as well as glycerol, so that the final solution had the following composition by weight:

100 parts of copolymer of acrylic and methacrylic acid;

100 parts of polyvinylpyrrolidone (LUVISKOL K90);

100 parts of glycerol;

55.7 parts of NaOH; and 2814 parts of water.

This solution was spread with an applicator on a plane support covered with a TERPHANE film. After evaporation of water, a polypropylene felt (VILEDON 237 F) whose thickness was 200 microns was applied to the dry membrane, the felt was previously moistened by immersion in a mixture of water and acetone. After further evaporation, a membrane which adheres strongly to the felt was obtained. The thickness of the assembly was 260 microns; its electrical resistance measured in the same conditions as for the preceding membranes was 210 m$\Omega$/cm$^2$ and its permeability to $Sb_2O_3$ is 0.011 mg/h-cm$^2$.

After a 41-day ageing test carried out in conditions almost similar to those relating to the example 1, the chacteristics of the membrane were as follows:

Electrical resistance: 240 m$\Omega$/cm$^2$; and

Permeability to $Sb_2O_3$: 0.018 mg/h-cm$^2$.

EXAMPLE 6

An aqueous solution was prepared from the copolymer mentioned in example 5. After partial neutralisation by triethylamine, an aqueous solution of polyvinylpyrrolidone (LUVISKOL K90) was added thereto as well as N-methylpyrrolidone and ethanol so that the final solution had the following composition by weight:

100 parts of copolymer of acrylic and methacrylic acid;

153 parts of polyvinylpyrrolidone (LUVISKOL K90);

80 parts of N-methylpyrrolidone;

70 parts of triethylamine;

380 parts of ethanol; and 2240 parts of water.

This solution was spread by means of an applicator on a plane surface covered with a TERPHANE sheet. After evaporation at 50° C, a film 50 microns thick was obtained. By immersion of this film in a 9N aqueous solution of $H_2SO_4$ a microporous membrane was obtained whose electric resistance was 70 m$\Omega$/cm$^2$ and whose permeability to $Sb_2O_3$ was 0.09 mg/h-cm$^2$.

It must be understood that the invention is in no way limited to the embodiments described, but it covers on the contrary all the variants. It is advantageously used for lead-acid storage batteries.

What is claimed is:

1. Semi-permeable membrane having a microporous structure comprising a first polymer and a second polymer intimately mixed together, wherein the first polymer is chosen from among the following polymers: polyacrylic acid, and methacrylic acid, or a mixture of these polymers; the average molecular weight of these polymers lying between 10,000 and a few million; wherein the second polymer is soluble in water and is chosen from among the following polymers: polyvinylpyrrolidone, polyvinylic alcohol, and a copolymer containing vinylpyrrolidone or vinylic alcohol sequences, or a mixture of these polymers; and wherein the microporous structure of the membrane is obtained by immersion, in an electrolyte, of a film whose composition by weight is as follows:

20 to 70% of the first polymer;

20 to 70% of the second polymer;

0 to 40% of a plasticizer of the preceding polymers, chosen from among the following substances: N-methylpyrrolidone, glycerol sulfolane, and hexamethylphosphoramide; and 0 to 20% of an organic or inorganic basic compound.

2. Membrane according to claim 1, wherein the thickness of the film from which it is produced lies between 10 and 70 microns.

3. The membrane according to claim 2 wherein the thickness is between 20 and 50 microns.

4. Membrane according to claim 1 wherein the second polymer is extracted partially from the film in the electrolyte while the plasticizer is mostly extracted therefrom.

5. Membrane according to claim 4, wherein the electrolyte is 9N aqueous $H_2SO_4$.

6. Membrane according to claim 1 wherein the film used to prepare it is reinforced by a permeable or macroporous support such as a fabric or felt in order to increase its dimensional stability.

7. Method of production of a membrane as defined in claim 6, the method consisting in depositing a felt or a permeable fabric on a plane support covered with a sheet of ethylene polyterephthalate, in impregnating this felt or this fabric with a solution which has the following composition:

2.5 to 15% of the first polymer or the mixture of first polymers;

2.5 to 20% of the second polymer or the mixture of second polymers;

0 to 10% of plasticizer of the preceding polymers;

0 to 5% of an inorganic or organic basic compound; and 70 to 90% of water containing 15 to 25% by volume of ethanol, the solution being spread on a plane support followed by evaporation of the water, and then the immersion of this film in an electrolyte, in evaporating the water, then in immersing the felt or the fabric thus treated in an electroiyte.

8. The method of claim 7 wherein the elecrolyte is 9N aqueous $H_2SO_4$, the thickness of the film is 20 to 50 microns thick.

9. Membrane according to claim 1 and having the following properties:
- an electrical resistance, determined in a 9N aqueous $H_2SO_4$ medium, of less than 150 m$\Omega$/cm$^2$;
- a permeability to $Sb_2O_3$ (antimony trioxide), determined in a 9N aqueous medium, of less than 0.2 mg/h-cm$^2$;
- a high chemical stability in a 9N aqueous and oxygenated $H_2SO_4$ medium; and
- a relative insensitivity of its mechanical properties to temperature.

10. Membrane according to claim 9 wherein the electrical resistance is less than 100 m$\Omega$/cm$^2$, the permeability is less than 0.1 mg/h-cm$^2$ and the temperature at which relative insensitivity is tested lies between $-20°$ C and 20° C.

11. Method of production of a membrane according to claim 1, consisting in immersing, in an electrolyte, a film prepared from an aqueous solution which comprises:
- a first polymer or a mixture of polymers chosen from among the following polymers: polyacrylic acid, polymethacrylic acid, and a copolymer with high acrylic or methacrylic acid contents;
- a second polymer or a mixture of second polymers chosen from among the following polymers: polyvinylpyrrolidone, polyvinylic alcohol, and copolymers containing vinylpyrrolidone or vinylic alcohol sequences;
- a plasticizer for the preceding polymers, chosen from among the following substances: N-methylpyrrolidone, glycerol, hexamethylphosphoramide, and sulfolane; and
- an inorganic basic compound or an organic basic compound.

12. Method of production of a membrane according to claim 11, consisting in preparing a film 10 to 70 microns and thick from an aqueous solution whose composition is as follows:
- 2.5 to 15% of the first polymer or the mixture of first polymers;
- 2.5 to 20% of the second polymer or the mixture of second polymers;
- 0 to 10% of plasticizer of the preceding polymers;
- 0 to 5% of an inorganic or organic basic compound; and
- 70 to 90% of water containing 15 to 25% by volume of ethanol, the solution being spread on a plane support followed by evaporation of the water, and then the immersion of this film in an electrolyte.

13. Method of treatment of a film prepared according to claim 12, consisting in immmersing the film in an electrolyte at a temperature lying between 10° C and 50° C, so that it will acquire a microporous structure indicated by its becoming opaque which makes it possible to use it as a semi-permeable membrane, said membrane having the following properties:
- an electrical resistance, determined in a 9N aqueous $H_2SO_4$ medium, of less than 150 m$\Omega$/cm$^2$;
- a permeability to $Sb_2O_3$ (antimony trioxide), determined in a 9N aqueous medium, of less than 02. mg/h-cm$^2$;
- a high chemical stability in a 9N aqueous and oxygenated $H_2SO_4$ medium; and
- a relative insensitivity of its mechanical properties to temperature.

14. The method of claim 13 wherein the electrolyte is 9N aqueous $H_2SO_4$, the temperature is ambient temperature and the membrane has an electrical resistance of less than 100 m$\Omega$/cm$^2$, the permeability is less than 0.1 mg/h-cm$^2$ and the relative insensitivity is measured at a temperature which lies between $-20°$ C and 20° C.

15. The method of claim 12 wherein the thickness is 20 to 50 microns thick and the electrolyte is 9N aqueous $H_2SO_4$.

16. The method of claim 11 wherein the electrolyte is 9N $H_2SO_4$, the inorganic basic compound is NaOH or KOH and the organic basic compound is triethylamine.

17. Membrane according to claim 1 wherein the average molecular weight is between 50,000 and a million, the electrolyte is aqueous $H_2SO_4$ and the organic or inorganic basic compound is NaOH, KOH or triethylamine.

18. Lead-acid storage cell comprising a positive electrode, a negative electrode, a separator and a sulphuric acid electrolyte, wherein the separator is at least partially constituted by a membrane according to claim 1.

* * * * *

UNITED STATES PATENT AND TRADEMARK OFFICE
CERTIFICATE OF CORRECTION

PATENT NO. : 4,109,066

DATED : August 22, 1978

INVENTOR(S) : Richard DICK et al

It is certified that error appears in the above-identified patent and that said Letters Patent are hereby corrected as shown below:

IN THE HEADING:

Inventors:

delete "Robert Gedessaud" insert -- Robert Gadessaud --

Signed and Sealed this

Twentieth Day of March 1979

[SEAL]

Attest:

RUTH C. MASON
*Attesting Officer*

DONALD W. BANNER
*Commissioner of Patents and Trademarks*